Figure 1:
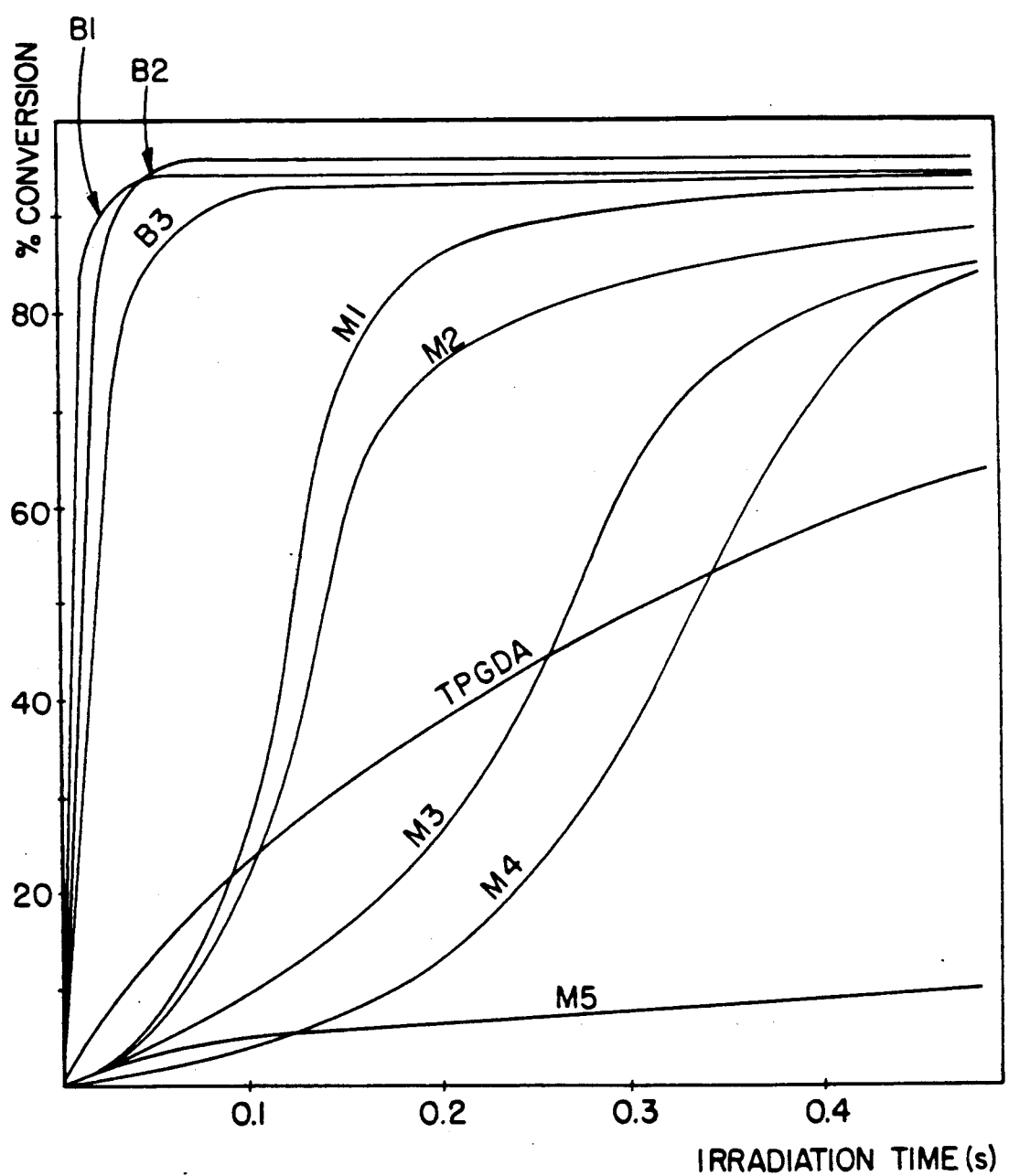

United States Patent [19]

Moussa et al.

[11] Patent Number: 5,047,261

[45] Date of Patent: Sep. 10, 1991

[54] PROCESS FOR THE MANUFACTURE OF COATINGS BY RADIOCROSSLINKING

[75] Inventors: Khalil Moussa, Hattiesburg, Miss.; Christian Decker, Rixheim, France; Jean-Claude Brosse, Connerre, France; Sammy Chevalier, Paris, France; Denis Couvert, Etampes, France

[73] Assignee: Societe Nationale des Pourdres et Explosifs, Paris, France

[21] Appl. No.: 540,374

[22] Filed: Jun. 19, 1990

[30] Foreign Application Priority Data

Jun. 29, 1989 [FR] France .................. 89 08651

[51] Int. Cl.$^5$ .............. C08F 24/00; C08F 224/00; B05D 3/06
[52] U.S. Cl. .................................. 427/54.1; 526/269; 522/96; 522/103; 522/169; 560/126
[58] Field of Search ............... 526/269; 522/96, 103, 522/169; 560/126, 127, 128

[56] References Cited

U.S. PATENT DOCUMENTS

| | | | |
|---|---|---|---|
| 2,967,173 | 1/1961 | Fang ......................... | 526/269 |
| 4,658,001 | 4/1987 | Kato et al. ............... | 526/291 |
| 4,753,990 | 6/1988 | Moriya et al. ........... | 525/277 |

Primary Examiner—Marion E. McCamish
Assistant Examiner—Susan Berman
Attorney, Agent, or Firm—Burknam and Archer

[57] ABSTRACT

The invention relates to a process for the manufacture of coatings by radiocrosslinking. A radio-crosslinkable composition (C) is produced first of all by mixing at least one (meth)acrylic compound (A) with a reactive diluent system comprising at least one mono(meth)acrylic carbonate (B) corresponding to the general formula (I):

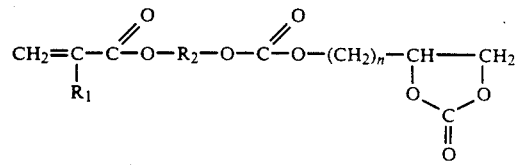

in which:
  $R_1$ denotes H or $CH_3$
  $R_2$ denotes an alkylene ether or alkylene chain which has a total number of carbon atoms of between 2 and 6,
  n denotes an integer between 1 and 6.

The composition (C) is next applied onto a substrate and is then radiocrosslinked, preferably using UV radiation.

Another subject of the invention is the crosslinkable compositions (C) in which the compound (A) and the carbonate (B) are not simultaneously 2,3-carbonyldioxypropyl 2-methacryloyloxyethyl carbonate, and carbonates of general formula (I) in which $R_2$ denotes $(CH_2)_m$ and in which m and n are integers such that $2 \leq m \leq 6$, $1 \leq n \leq 6$ and $n \neq 1$ when $m=2$ and $R_1$ denotes $CH_3$. The carbonates of general formula (I) ae highly photosensitive, and this allows irradiation times which are very markedly shorter than those used hitherto with mono(meth)acrylic diluents, or else makes it possible to photocrosslink in the absence of photoinitiator.

10 Claims, 5 Drawing Sheets

PROCESS FOR THE MANUFACTURE OF COATINGS BY RADIOCROSSLINKING

The invention relates to a process for the manufacture of coatings by radiocrosslinking of liquid compositions at room temperature (approximately 20° C.) containing at least one monomeric or oligomeric (meth)-acrylic compound and a reactive diluent system containing at least one mono(meth)acrylic compound. These compositions can radiocrosslink with the aid of suitable radiocrosslinking means, especially of photocrosslinking, by polymerization of the (meth)acrylic double bonds, and this results in a cure of the composition and in coatings being obtained.

The invention also relates to new crosslinkable compositions and to new (meth)acylic carbonates which may be employed especially for making use of the abovementioned process according to the invention.

A "(meth)acrylic" compound means a compound containing at least one

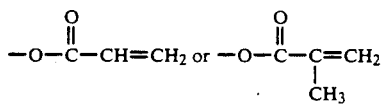

group.

A "coating" means a nonstaining, cohesive, polymerized film coating a substrate such as wood, paper, a metal, a plastic or inorganic material, and adhering to this substrate.

The compositions which are liquid at room temperature and which are employed to obtain coatings associate at least one monomeric or oligomeric (meth)acrylic compound with a reactive diluent system which makes it possible, in a first step, to reduce the viscosity of the composition when the monomeric or oligomeric (meth)-acrylic compound, or a mixture of such compounds, is too viscous to be applied correctly as a film onto the substrate. In a second step the reactive diluent system takes part in the polymerization of the (meth)a-crylic compound by copolymerization, and this makes it possible to obtain the desired mechanical properties.

This reactive diluent system which is miscible with the monomeric or oligomeric (meth)acrylic compound(s) contains at least one diluent containing one or more (meth)acrylic groups, and this makes this copoly-merization possible Very many reactive diluent systems have already been described in the literature. Reactive diluents can be categorized into two groups: vinyl monomers and acrylic monomers.

The advantage of vinyl monomers like N-vinylpyr-rolidone is that they make it possible to obtain highly reactive mixtures. However, they are volatile and very often toxic. Moreover, with N-vinyl-pyrrolidone, which is the most widely employed vinyl monomer, fairly hygroscopic coatings are obtained, and this alters their mechanical properties.

Acrylic monomers do not exhibit this disadvantage, but result in mixtures which are less reactive than with N-vinylpyrrolidone.

The specialist is therefore searching for acrylic monomers which can be employed as a reactive diluent and which are as reactive as N-vinylpyrrolidone or, at least, which are more reactive than the acrylic diluents employed hitherto in the processes for the manufacture of coatings by radiocrosslinking.

Insofar as acrylic diluents are concerned, the specialist knows that the use of polyfunctional acrylates such as hexanediol diacrylate (HDDA) or trimethylolpropane triacrylate (TMPTA) enables the reactivity to be increased in comparison with the use of monofunctional acrylates such as phenoxyethyl acrylate (PEA), betahy-droxyethyloxazolidone acrylate and isopropyl betahy-droxyethylcarbamate acrylate. However, when compared with the use of monofunctional acrylates, the use of polyfunctional acrylates results in a residual unsaturation content which is markedly higher after radiocrosslinking, and a result of this is a less satisfactory behaviour of the coating towards light during aging, that is to say that it yellows rapidly with possible losses of mechanical properties.

The specialist is therefore searching for monofunctional acrylate diluents which ensure good aging of the coatings, which ensure good utilization properties such as flexibility, adhesion or abrasion resistance, and which are as reactive as polyfunctional acrylates, for obvious reasons of costs and profitability.

EP 56,526 describes radiocrosslinkable compositions which may contain a monoacrylic carbonate associated with a polyfunctional acrylate. These carbonates and the corresponding compositions are very markedly less reactive than those according to our invention.

The same applies in the case of the monoacrylic carbonates described in EP 1,088.

Furthermore, FR 2,453,859 describes the use of 2,3-carbonyldioxypropyl 2-methacryloyloxyethyl carbonate as an agent for extracting metals of value from aqueous solutions.

No solution to the abovementioned problem is therefore to be found in the processes and compositions employed hitherto.

This problem is solved unexpectedly by the process according to the present invention, as well as by the new radiocrosslinkable compositions and the new mono(meth)acrylic carbonates which it employs.

What is involved is an ultrarapid process for the manufacture of coatings by radiocrosslinking, carried out on the scale of a few milliseconds, even though employing a mono(meth)acrylic reactive diluent.

As is generally well known, the rates are lower for methacrylic derivatives when compared with the corresponding acrylic derivatives. Insofar as the kinetic aspect is concerned, only the comparison between acrylates or between methacrylates is significant.

The subject of the present invention is therefore a process for the manufacture of coatings by radiocrosslinking, characterized in that the procedure is according to the following successive stages:

a) A radiocrosslinkable composition (C) is produced by mixing at least one (meth)acrylic compound (A) with a reactive diluent system comprising at least one mono(meth)acrylic carbonate (B) corresponding to the general formula (I):

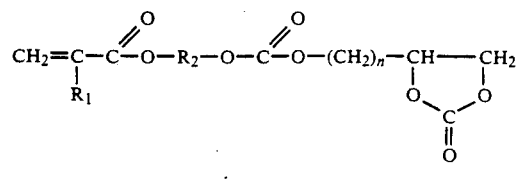

in which:

$R_1$ denotes hydrogen or the methyl group, $R_2$ denotes an alkylene ether or alkylene chain optionally substituted by at least one methyl or ethyl group, which has a total number of carbon atoms of between 2 and 6, preferably an alkylene chain of formula $(CH_2)_m$, m being an integer such that $2 \leq m \leq 6$, preferably 2, n denotes an integer such that $1 \leq n \leq 6$, preferably 1, 2 or 4, b) the radiocrosslinkable composition (C) is applied onto a substrate, c) the composition (C) thus applied is radio-crosslinked.

The following chains may be mentioned as an example of alkylene ether or alkylene chain in the case of

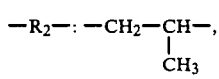

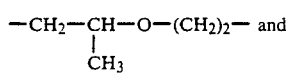

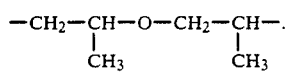

In a particularly preferred manner, the mono(meth)acrylic carbonate (B) of general formula (I) is chosen from the group consisting of 2,3-carbonyldioxypropyl 2-acryloyloxyethyl carbonate (B1), 3,4-carbonyldioxybutyl 2-acryloyloxyethyl carbonate (B2) and 5,6-carbonyldioxyhexyl 2-acryloyloxyethyl carbonate (B3)

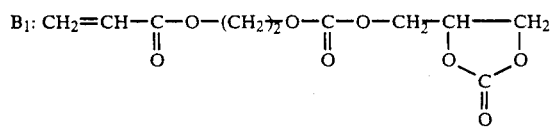

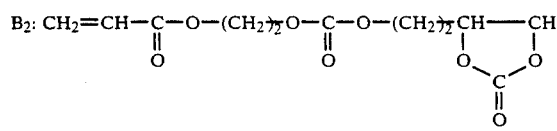

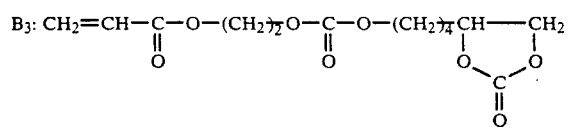

In comparison with the known processes using a monoacrylic reactive diluent system, the process according to our invention, while ensuring an equivalent level of resistance to light and of utilization properties of the coating, makes possible radiocrosslinking rates which are very markedly superior, of the order of some milliseconds, and this results in a very appreciable saving in the time of exposure to the radiations to obtain the radiocrosslinking.

This very high reactivity of the compounds of general formula (I) according to our invention and of the corresponding radiocrosslinkable compositions towards radiations makes it possible, for example, to reduce the quantity of initiator when photocrosslinking is employed in the presence of an initiator, while keeping to very short exposure periods. This saving in initiator is very appreciable in the case of use of systems such as benzophenone/tertiary amine or thioxanthone/tertiary amine, because it makes it possible to reduce considerably the proportion of amine required. Now, it is well known that the presence of an amine, apart from the fact that its odour is unpleasant, results in yellowing and a considerable decrease in the hardness of the coating.

In addition, this reactivity is so high that the Applicant Company found that, particularly surprisingly, it was possible to obtain coatings which had good mechanical properties by exposing the compounds of general formula (I) according to our invention and the corresponding compositions to UV radiation for only approximately 1 s, without the need for these compounds and compositions to contain a photocrosslinking initiator. To our knowledge, it has never been possible to obtain a result of this kind with the monoacrylic compounds and the corresponding compositions employed in the field of photocrosslinking.

An additional and very considerable advantage of the photocrosslinkable compositions with a low content of initiator, or containing no initiator, lies in the fact that they are much more transparent to UV, and this makes it possible to polymerize in depth, in thicknesses of up to 1 cm.

The mono(meth)acrylic carbonates (B) corresponding to the general formula (I) can be obtained by reaction of the chloroformate of structure

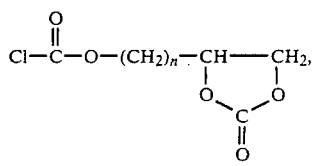

n having the abovementioned meaning, with the hydroxylated methacrylate of formula

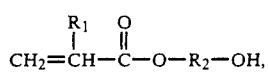

$R_1$ and $R_2$ having the abovementioned meaning, in the presence of a tertiary amine, for example pyridine, as a scavenger for the hydrochloric acid formed, in organic solvent medium, for example dichloromethane. They are then isolated and identified using known processes. A general method of this kind is described especially in Example 7 of abovementioned FR 2,453,859.

The abovementioned chloroformate itself can be obtained by complete phosgenation of the corresponding triol $HO\text{-}(CH_2)_n\text{---}CHOH\text{---}CH_2OH$, according to a well-known process described, for example, in U.S. Pat. No. 2,446,145. As an example of a triol there may be mentioned glycerol (n=1), 1,2,4-butanetriol (n=2) and 1,2,6-hexanetriol (n=4).

The proportions of the constituents of the radiocrosslinkable composition (C) may vary as a function of the mechanical properties required for the coating.

The (meth)acrylic compound (A) preferably represents 25 to 60% by weight of the composition (C) and the reactive diluent system represents 75 to 40% by weight of the composition (C).

In a particularly preferred manner, the composition (C) consists only of the compound (A) and the reactive diluent system, with the optional addition of a small quantity, of the order of a few % by weight, of a photocrosslinking initiator and/or of the additives usually employed in radiocrosslinkable compositions.

According to a preferred alternative form of the invention, a reactive diluent system consisting solely of the carbonate (B) of general formula (I) is employed.

According to another alternative form of the invention, the methacrylic compound (A) is identical to the mono(meth)acrylic carbonate (B) of general formula (I). In this case the radiocrosslinkable composition (C) preferably consists solely of the said mono(meth)acrylic carbonate compound (B), optionally in the presence of a small quantity, of the order of a few % by weight, of a radiocrosslinking initiator and/or of the additives usually employed in radiocrosslinkable compositions.

According to other alternative forms, the reactive diluent system may consist of a mixture of a number of carbonates (B) corresponding to the general formula (I) or of the mixture of a carbonate (B) with another reactive diluent, for example acrylic or vinylic, and/or with a nonreactive diluent.

The (meth)acrylic compound (A) is preferably a liquid poly(meth)acrylic oligomer with (meth)acrylic ends, whose number-average molecular mass is between 500 and 5,000, chosen preferably from the group consisting of (meth)acrylic polyester oligomers, (meth)acrylic epoxy oligomers, (meth)acrylic polycarbonate oligomers, (meth)acrylic polyether oligomers and (meth)acrylic polyurethane oligomers.

The (meth)acrylic polyurethane oligomers can, for example, be obtained by reaction of a polyol with a polyisocyanate, followed by the reaction of the product obtained with a (meth)acrylic ester containing an active hydrogen.

As an example of a (meth)acrylic ester containing an active hydrogen there may be mentioned hydroxyalkyl (meth)acrylates, especially 2-hydroxyethyl (meth)acrylate and 2-hydroxypropyl (meth)acrylate.

The following compounds may be mentioned, by way of guidance, among suitable polyisocyanates: 2,4- and 2,6-diisocyanatotoluene, 2,4- and 2,6-diisocyanato-1-methylcyclohexane, 4,4'-diisocyanatodicyclohexyl methane, diisocyanatoisophorone, hexamethylene diisocyanate, diisocyanato-2,2,4-trimethylhexamethylene, biurets based, for example, on hexamethylene diisocyanate, and mixtures thereof.

Among the polyols which are suitable there may be mentioned:
hydroxylated polyepichlorohydrins,
hydroxylated polybutadienes,
hydroxytelechelic polycarbonates obtained by phosgenation or transesterification of aliphatic, cycloaliphatic or aromatic diols or triols, by themselves or mixed,
polycaprolactones,
hydroxytelechelic polyesters obtained by reaction of a polyol (such as ethylene glycol, diethylene glycol, glycerol, 1,3-butanediol, propoxylated bis-phenol A, sorbitol, and the like) with a polycarboxylic acid or its anhydride or its ester (such as adipic acid and maleic, succinic or terephthalic anhydride),
polyetherpolyols obtained by addition of an alkylene oxide (such as ethylene oxide, propylene oxide or tetrahydrofuran) to a polyol such as indicated above,
polyether esters such as polydiethylene glycol adipate and polytriethylene glycol adipate in which the polyether replaces a part of the glycol,
hydroxytelechelic polyurethanes formed from polyols such as those mentioned above and from polyisocyanates such as those mentioned above.

In a particularly preferred manner, the (meth)acrylic polyurethane oligomers are linear di(meth)acrylic polyurethane oligomers.

As already mentioned, the (meth)acrylic compound (A) may, according to an alternative form of the invention, be identical with the mono(meth)acrylic carbonate (B) of general formula (I).

The (meth)acrylic compound (A) may also be a mono- or poly(meth)acrylic monomer usually employed in radiocrosslinkable compositions, like, for example, the diacrylate obtained by reaction of acrylic acid with bisphenol A diglycidyl ether (BADGE).

To make use of the process according to the invention the composition (C) is radiocrosslinked after having been applied onto the substrate to be coated in the form of a thin film, using a means known per se. The thickness is preferably lower than 0.2 mm.

The radiation employed may be, for example, an electromagnetic radiation, an electon bombardment or a nuclear radiation.

An UV radiation, in the presence of a photo-initiator, is preferably employed.

Examples of a photoinitiator which may be mentioned, no limitation being implied, are benzoin ethers and phenone derivatives such as benzophenone or diethoxyacetophenone, by themselves (for example the photo-initiator marketed by Ciba under the registered trademark "Irgacure 651" or the photoinitiator marketed by Merck under the registered trademark "Darocur 1116") or in combination with a tertiary amine, for example methyldiethanolamine.

According to another alternative form, an UV radiation is employed in the presence of a photo-initiator. This method of operation and the advantages which this offers, have already been mentioned above.

A preferred embodiment of the invention consists in passing the substrate coated with the composition under an UV lamp, at a desired rate.

The composition (C) employed for making use of the process according to the invention may contain all the additives usually employed in radiocrosslinkable coating compositions, especially agents for adjusting the surface gloss of the coating, surfactants, fillers or colorants.

Another subject of the present invention is, firstly, the abovementioned radiocrosslinkable compositions (C) which are novel when the compound (A) and the carbonate (B) are not simultaneously 2,3-carbonyldioxypropyl 2-methacryloyloxyethyl carbonate and, secondly, the abovementioned novel carbonates (B) of formula (I) in which $R_2$ denotes $(CH_2)_m$ and in which m and n are identical or different integers such that:

$2 \leq m \leq 6$ $1 \leq n \leq 6$ $n \neq 1$ when $m = 2$ and $R_1$ denotes the methyl group.

The following examples illustrate the invention without, however, limiting it.

EXAMPLE 1

Synthesis of 2,3-carbonyldioxypropyl 2-acryloyloxyethyl carbonate (B1)

Into a jacketed reactor fitted with a cryostat, a thermometer probe and dropping funnel are introduced 116 g (1 mol) of hydroxyethyl acrylate, 180.45 g (1 mol) of 2,3-carbonyldioxypropyl chloroformate obtained by phosgenation of glycerol according to the process described in U.S. Pat. No. 2,446,145 and 1 l of dry dichloromethane. The asesembly is purged with argon and the mixture is then cooled to 0° C. with stirring.

79 g (1 mol) of pyridine are then added dropwise to the mixture using the dropping funnel. This method of operation makes it possible to maintain a temperature below 5° C. When the addition is finished the reaction mixture is allowed to return to room temperature, approximately 20° C.

The reaction mixture is then filtered to remove the pyridinium hydrochloride formed.

The filtrate is washed with an aqueous solution of 0.2 N hydrochloric acid and then with distilled water until neutral.

After drying over magnesium sulphate and evaporation of the solvent, 242 g (93% yield) of compound B1 are obtained, identified by its IR, NMR and mass spectra. Its purity is of the order of 97%, determined by the usual chromatographic techniques.

EXAMPLE 2

Synthesis of 3,4-carbonyldioxybutyl 2-acryloyloxyethyl carbonate (B2)

The above operating procedure of Example 1 is reproduced, the 2,3-carbonyldioxypropyl chloroformate being replaced with 194.45 g (1 mol) of 3,4-carbonyldioxybutyl chloroformate obtained by phosgenation of 1,2,4-butanetriol according to the process described in U.S. Pat. No. 2,446,145, the glycerol being replaced with 1,2,4-butanetriol.

222 g (81% yield) of compound B2 are obtained, identified by its IR, NMR and mass spectra. Its purity is of the order of 96%.

EXAMPLE 3

Synthesis of 5,6-carbonyldioxyhexyl 2-acryloyloxyethyl carbonate (B3)

The above operating procedure of Example 1 is reproduced, the 2,3-carbonyldioxypropyl chloroformate being replaced with 222.45 g (1 mol) of 5,6-carbonyldioxyhexyl chloroformate obtained by phosgenation of 1,2,6-hexanetriol according to the process described in U.S. Pat. No. 2,446,145, the glycerol being replaced with 1,2,6-hexanetriol. 201 g (90.5% yield) of compound B3 are obtained, identified by its IR, NMR and mass spectra. Its purity is of the order of 97%.

EXAMPLE 4

Synthesis of 2,3-carbonyldioxypropyl 2-methacryloyloxyethyl carbonate (B4)

The above operating procedure of Example 1 is reproduced, hydroxyethyl acrylate being replaced with 130 g (1 mol) of hydroxyethyl methacrylate.

215 g (78.5% yield) of compound B4 are obtained, identified by its IR, NMR and mass spectra. Its purity is of the order of 97%.

EXAMPLE 5 TO 14

Production of coatings by photocrosslinking of compositions (C) consisting solely of a carbonate monomer (B) of general formula (I) in the presence of a photoinitiator Comparison with coatings obtained using known processes from monomers The photoinitiator employed in all these examples, including the comparative examples, is the compound of formula:

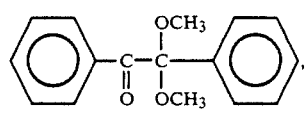

marketed by Ciba under the registered trademark Irgacure 651.

The various compositions are produced by mixing 100 parts by weight of monomer with 5 parts by weight of the photoinitiator.

Each composition is then applied onto a sodium chloride plate with the aid of a straight edge calibrated to form a uniform film 24 μm in thickness.

The composition thus applied is then irradiated with an UV source consisting of a medium-pressure mercury vapour lamp with a power of 700 W, whose radiation is concentrated with the aid of a semielliptical reflector. The sample is exposed to an irradiance of $14.6 \times 10^{-2}$ W cm$^{-2}$.

The irradiance measurements are carried out with the aid of an UV radiometer equipped with a cell whose spectral window ranges from 250 to 400 nm.

The photopolymerization kinetics of the compositions were followed using infrared spectrometry by exposing the sample to UV radiation for a well-defined period which ranges from 1/300 of a second to 1 s by virtue of the use of a photo shutter, in air and at room temperature.

For a given irradiation time, the progress of the polymerization is determined from the decrease in the characteristic absorption bands of the (meth)acrylate functional group according to a known method described, for example, by G. L. Collins, D. A. Young and J. R. Costanza, Celanese Research Company, Journal of Coating Technology, vol 48, No. 618, July 1976.

This method also permits access to the residual unsaturation contents after irradiation.

The Persoz hardness of the coatings obtained after 1 s of irradiation is determined according to French standard NF T 30016.

Examples 5 to 7 correspond to the process according to the present invention, used respectively with the monomers B1, B2 and B3 obtained according to Examples 1 to 3.

Examples 8 to 14 are comparative examples, used according to known processes, making it possible to demonstrate the advantages of the process according to our invention.

Example 8 was used with the monomer M$_1$ of formula

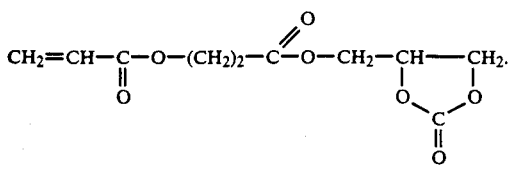

This monomer differs from the monomer B1 according to the invention only in the elimination of an oxygen, that is to say that an ester functional group replaces the linear carbonate functional group of B1.

Example 9 was used with the monomer M2 of formula

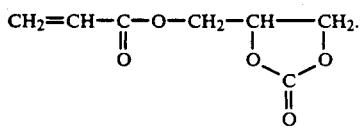

This example corresponds to the state of the art described by abovementioned EP 1,088.

Example 10 was used with the monomer M3 of formula

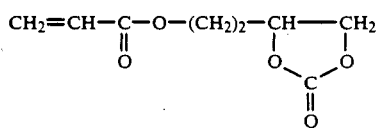

Example 11 was used with the monomer M4 of formula

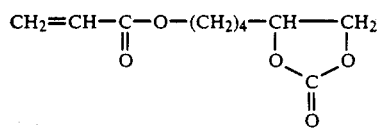

Example 12 was used with the monomer M5 of formula

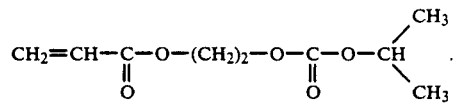

This example corresponds to the state of the art described by abovementioned EP 56,526.

Example 13 was used with tripropylene glycol diacrylate (TPGDA) of formula

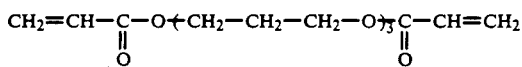

Example 14 was used with ethyl diethylene glycol acrylate (EDGA) of formula

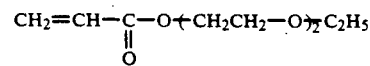

FIG. 1 brings together the curves obtained for each example, representing the degree of conversion of the acrylic functional groups present initially (degree of progress of the polymerization) as a function of the irradiation time, each monomer employed being indicated by its abovementioned code.

Insofar as Example 14 is concerned, the composition remains pasty and staining after 1 s of exposure. No coating is therefore obtained and the corresponding curve is not shown.

In the case of all the other examples, the coatings adhere to the substrate and are dry to the touch, that is to say that they are not staining and that they exhibit no adhesiveness to the finger, when the degree of conversion reaches 60 to 80%, that is at least 10 times more rapidly according to the present invention than according to the known processes.

Table 1, which follows, states, in the case of each example, the initial concentration of acrylic functional groups ($[A]_0$), the rate of photopolymerization (Rp), the photosensitivity (S), that is to say the energy needed to photopolymerize half of the acrylic functional groups, the residual unsaturation content ($[A]_{resid}$) after 1 s of irradiation, and the Persoz hardness of the coating obtained after 1 s of irradiation. The code (/) means measurement not carried out.

TABLE 1

| Ex No. | Monomer | $[A]_0$ (eq kg$^{-1}$) | Rp (eq kg$^{-1}$ s$^{-1}$) | S (mJ cm$^{-2}$) | $[A]_{resid}$ (%) | Persoz hardness (s) |
|---|---|---|---|---|---|---|
| 5 | B1 | 3.65 | 385 | 0.9 | 2 | 200 |
| 6 | B2 | 3.46 | 167 | 1.5 | 2 | / |
| 7 | B3 | 3.15 | 65 | 3 | 4 | 18 |
| 8 | M1 | 3.90 | 31 | 20 | 7 | / |
| 9 | M2 | 5.54 | 35 | 22 | 11 | 340 |
| 10 | M3 | 5.11 | 11 | 50 | 6 | / |
| 11 | M4 | 4.44 | 11 | 50 | 6 | 14 |
| 12 | M5 | 4.70 | 2.5 | / | 87 | / |
| 13 | TPGDA | 6.33 | 16 | 44 | 33 | / |
| 14 | EGDA | 5.05 | No coating. Product remaining pasty and staining | | | | |

These results demonstrate the exceptional and surprising reactivity and photosensitivity of the monomers B1, B2 and B3 according to our invention. The degree of conversion is higher than 80% after 0.02 s of irradiation whereas this degree is only 1 to 2% with the monoacrylic monomers employed hitherto. This reactivity and this photosensitivity are even very markedly superior to those of a very widely employed diacrylate, TPGDA.

After 2.5 ms of exposure, the composition based on the monomer B1 according to the present invention already shows 80% of insoluble, which is quite exceptional.

The comparative examples 8 to 14 also show that all the structural elements of the carbonates (B) of general formula (I) according to the invention are necessary and contribute to a synergy effect. The absence of a single one of these elements (linear carbonate functional group, cyclic carbonate functional group, and the like) suffices to make the product lose the abovementioned exceptional properties.

It can be ascertained that these properties are not obtained at the expense of the hardness of the coating obtained, and that the residual unsaturation content is low, which is advantageous for the reasons which we have already mentioned.

EXAMPLES 15 AND 16

Production of a coating by photocrosslinking of a composition (C) consisting solely of a monomethacrylic carbonate monomer (B) of general formula (I) in the presence of a photoinitiator Comparison with a coating obtained using a known process from a monomethacrylic monomer The operating conditions are identical with those relating to Examples 5 to 14.

Example 15 corresponds to the process according to the present invention, used with the monomer B4 obtained according to Example 4.

Example 16 is a comparative example used according to a known process with the monomer M6 of formula

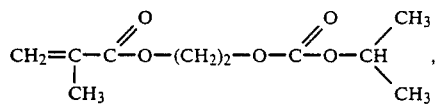

which corrresponds to the state of the art described by abovementioned EP 56,526.

Figure 2:
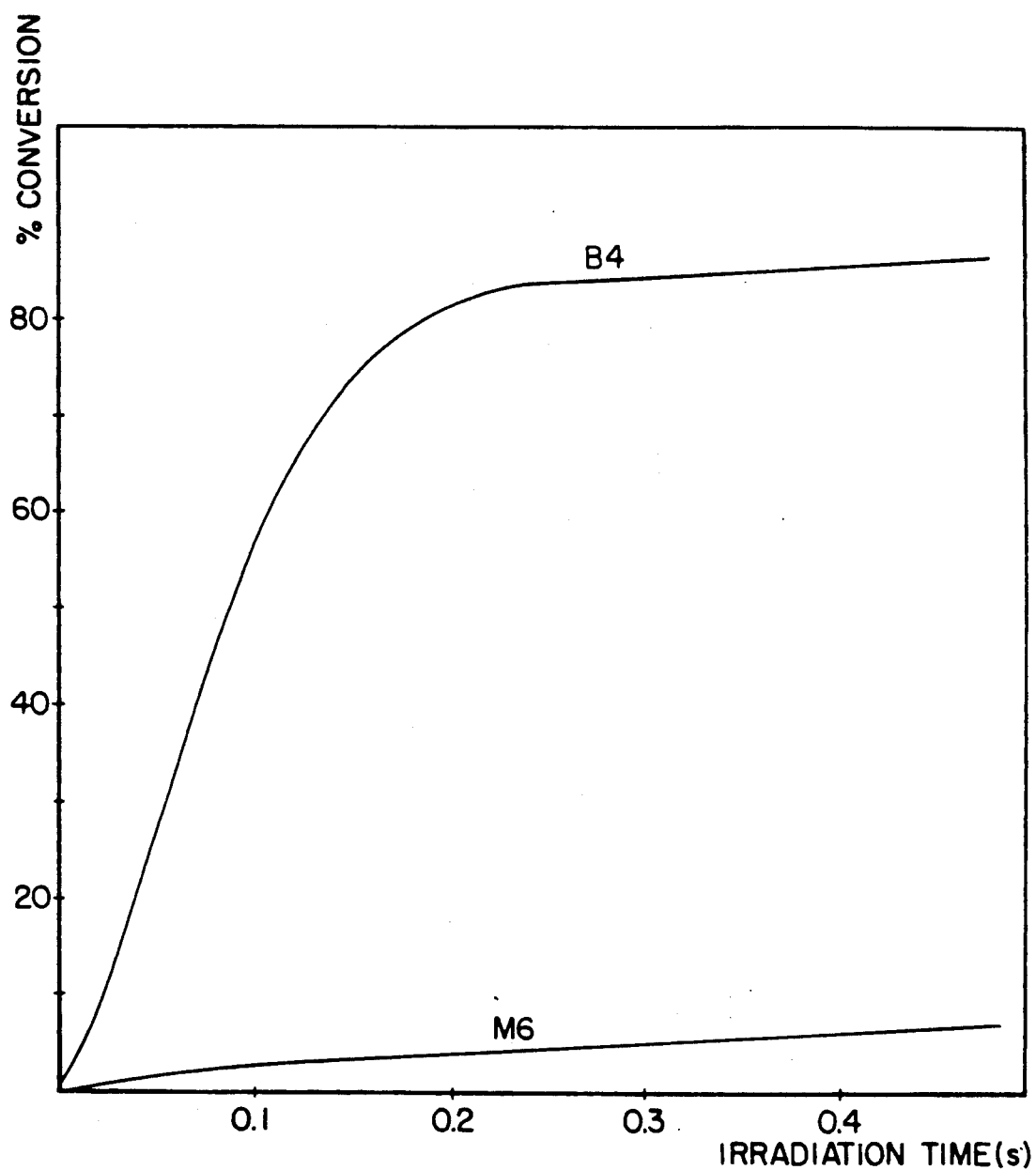

FIG. 2 brings together the curves obtained, representing, in the case of each example, the degree of conversion of the methacrylic functional groups present initially (degree of progress of the polymerization) as a function of the irradiation time, each monomer employed being indicated by its abovementioned code.

Table 2, which follows, states, in the case of each example, the initial concentration of methacrylic functional groups ($[A]_0$), the rate of photopolymerization (Rp), the photosensitivity (S) and the residual unsaturation content ($[A]_{resid}$) after 1 s of irradiation.

TABLE 2

| Ex No. | Monomer | $[A]_0$ (eq kg$^{-1}$) | Rp (eq kg$^{-1}$ s$^{-1}$) | S (mJ cm$^{-2}$) | $[A]_{resid}$ (%) |
|---|---|---|---|---|---|
| 15 | B4 | 3.46 | 19 | 13 | 10 |
| 16 | M6 | 4.4 | 0.7 | >100 | 90 |

In Example 16, S cannot be measured, since the 50% degree of conversion has not been reached. According to FIG. 2, it can be deduced, however, that S is markedly higher than 100.

These results demonstrate the exceptional and surprising reactivity and photosensitivity of the monomer B4 according to our invention. A degree of conversion of 80% is reached after 0.2 s, whereas this degree is only approximately 4% with the monomethacrylic monomer M6 employed in the state of the art.

On comparing Example 15 according to the invention with Comparative Examples 8 to 14 it is found that the monomethacrylic monomer B4 employed according to the invention is even more reactive and photosensitive than the monoacrylic monomers employed hitherto, which is unexpected.

EXAMPLE 17 TO 26

Production of coatings by photocrosslinking of compositions (C) obtained by mixing a linear diacrylic polyurethane oligomer with a carbonate (B) of general formula (I) employed as reactive diluent, in the presence of a photoinitiator Comparison with coatings obtained under the same conditions with the reactive diluents employed hitherto The photoinitiator employed in all these examples, including the comparative examples, is the same as that employed for Examples 5 to 16 (Irgacure 651).

The diacrylic linear polyurethane oligomer employed in all these examples is the diacrylic linear polyurethane resin marketed by SNPE under the registered trademark "Actilane 20", of average molecular mass 1,300, obtained from:
2n moles of 2-hydroxyethyl acrylate,
2n moles of isophorone diisocyanate (IPDI)
n moles of ethylene glycol polyadipate.

The various compositions are produced by mixing 50 parts by weight of the diacrylic polyurethane, 50 parts by weight of reactive diluent and 5 parts by weight of photoinitiator.

The operation is then carried out as in the case of Examples 5 to 16 to apply the compositions onto the substrate, to crosslink the compositions thus applied, to study the photopolymerization kinetics and to measure the Persoz hardness of the coatings obtained.

The Persoz hardness is measured firstly after 0.2 s of irradiation and, secondly, after 1 s of irradiation.

Examples 17 to 19 correspond to the process according to the present invention used respectively with the monomers B1, B2 and B3, obtained according to Examples 1 to 3, as reactive diluent.

Examples 20 to 26 are comparative examples used according to known processes, making it possible to demonstrate the advantages of the process according to our invention.

The reactive diluents employed for Examples 20 to 23 are respectively the abovementioned monomers M1, M2, M3 and M4 employed in the case of Examples 8, 9, 10 and 11 respectively.

The reactive diluents employed for Examples 24 to 26 are EDGA, TPGDA and 1,6-hexanediol diacrylate (HDDA) respectively.

The coatings adhere to the substrate and are dry to the touch when the degree of conversion reaches 60 to 80%, that is approximately 10 times more rapidly according to the present invention than according to the known processes.

Figure 3:
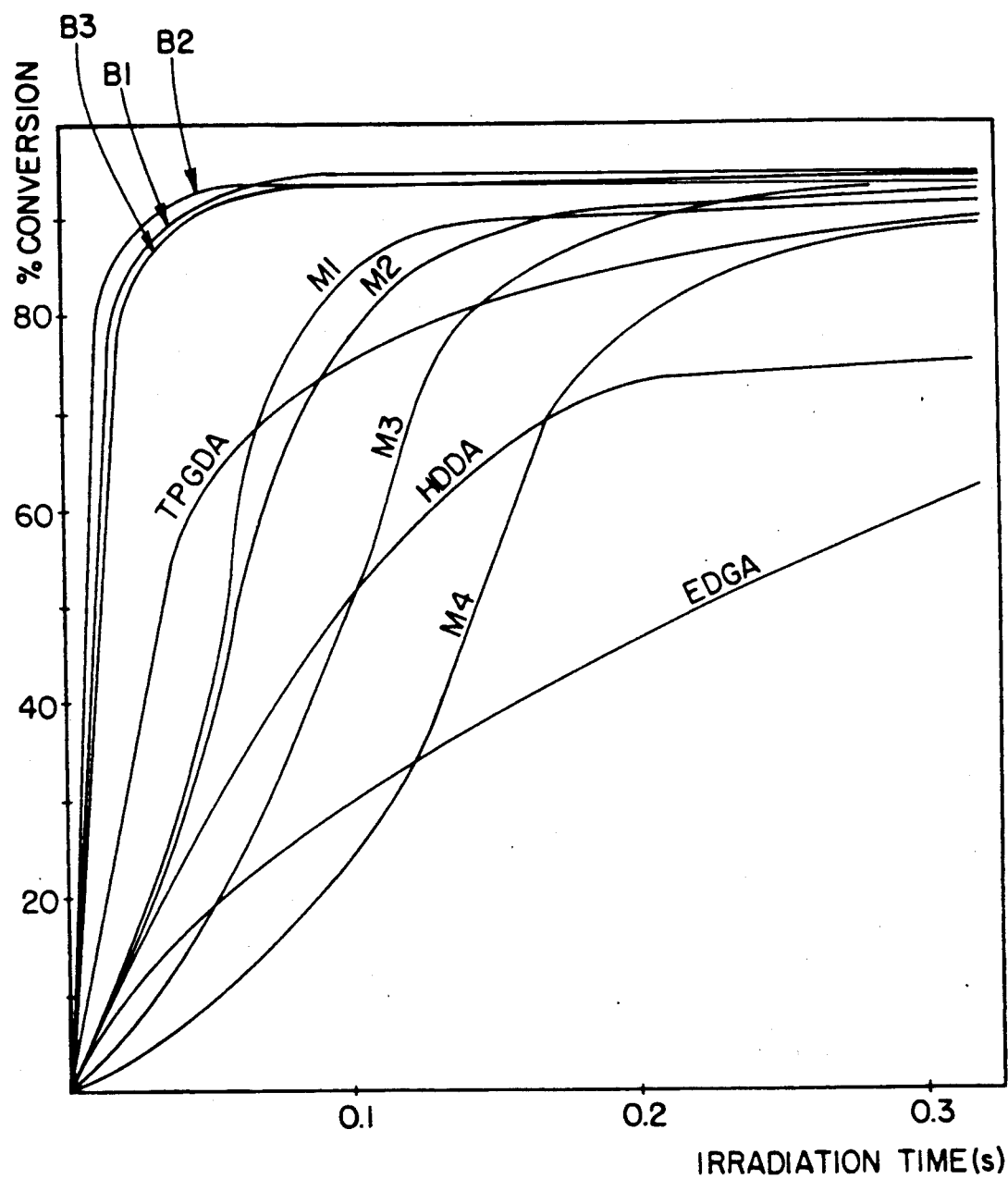

FIG. 3 brings together the curves obtained for each example, showing the degree of conversion of the acrylic functional groups present initially as a function of the irradiation time, each reactive diluent employed being indicated by its abovementioned code.

Table 3, which follows, states, in the case of each example, the initial concentration of acrylic functional groups ($[A]_0$), the photopolymerization rate (Rp), the photosensitivity (S), the residual unsaturation content ($[A]_{resid}$) after 1 s of irradiation, and the Persoz hardness of the coating obtained after 0.2 s and 1 s of irradiation.

TABLE 3

| Ex No. | Reactive diluent | [A]₀ (eq kg⁻¹) | Rp (eq kg⁻¹ s⁻¹) | S (mJ cm⁻²) | [A]$_{resid}$ (%) | Persoz hardness (s) after 0.2 s | after 1 s |
| --- | --- | --- | --- | --- | --- | --- | --- |
| 17 | B1 | 2.61 | 113 | 1.5 | 5 | 90 | 140 |
| 18 | B2 | 2.51 | 120 | 1.5 | 4 | / | / |
| 19 | B3 | 2.35 | 90 | 1.9 | 6 | 20 | 30 |
| 20 | M1 | 2.73 | 30 | 8 | 5 | / | / |
| 21 | M2 | 3.55 | 29 | 10 | 4 | 260 | 290 |
| 22 | M3 | 3.32 | 20 | 15 | 6 | / | / |
| 23 | M4 | 3.00 | 17 | 50 | 9 | 20 | 30 |
| 24 | EDGA | 3.31 | 7 | 30 | 3 | 30 | 35 |
| 25 | TPGDA | 3.95 | 57 | 4.4 | 10 | 120 | 190 |
| 26 | HDDA | 4.99 | 30 | 11 | 11 | 120 | 210 |

These results demonstrate the exceptional and surprising reactivity and photosensitivity of the compositions according to our invention. An 80% degree of conversion is reached after 0.02 s of irradiation, whereas this degree is lower than 10% with the reactive diluents employed hitherto.

The reactivity and the photosensitivity of the compositions according to our invention employing a monoacrylic reactive diluent are even very clearly superior to those of the known compositions employing a diacrylic reactive diluent like TPGDA or HDDA, and this is highly advantageous for the reasons which have already referred to.

These examples also confirm that all the structural elements of the carbonates (B) of general formula (I) according to the invention are necessary and contribute to a synergy effect.

It may be noted that these advantageous results are not obtained at the expense of the hardness of the coating obtained and that the residual unsaturation content is low.

EXAMPLES 27 TO 31

Production of coatings by photocrosslinking of compositions (C) obtained by mixing an acrylic epoxy compound with a carbonate (B) of general formula (I) employed as reactive diluent, in the presence of a photoinitiator Comparison with coatings obtained under the same conditions with known reactive diluents The photoinitiator employed for all these examples, including the comparative examples, is the same as that employed for Examples 5 to 26 (Irgacure 651).

The acrylic epoxy compound employed in all these examples is the diacrylic epoxy resin marketed by SNPE under the registered trademark "Actilane 72", obtained by reaction of acrylic acid with DGEBA.

The various compositions are produced by mixing 50 parts by weight of the diacrylic epoxy resin, 50 parts by weight of reactive diluent and 5 parts by weight of photoinitiator.

The operation is then carried out as in the case of Examples 5 to 26 to apply the compositions onto the substrate, to crosslink the compositions thus applied, to study the photopolymerization kinetics and to measure the Persoz hardness of the coatings obtained, except insofar as the UV source is concerned, which is, in the case of these Examples 27 to 31, a medium-pressure mercury vapour lamp with a power of 2,000 W. The samples are exposed at an irradiance of $52.5 \times 10^{-2}$ W cm⁻².

Examples 27 to 29 correspond to the process according to the present invention, used respectively with the monomers B1, B2 and B3, obtained according to Examples 1 to 3, as reactive diluent.

Examples 30 and 31 are comparative examples, used with known reactive diluents, TPGDA and EGDA respectively.

The coatings according to the invention adhere to the substrate and are dry to the touch after approximately 15 ms of irradiation, that is more rapidly than according to the known processes.

Figure 4:
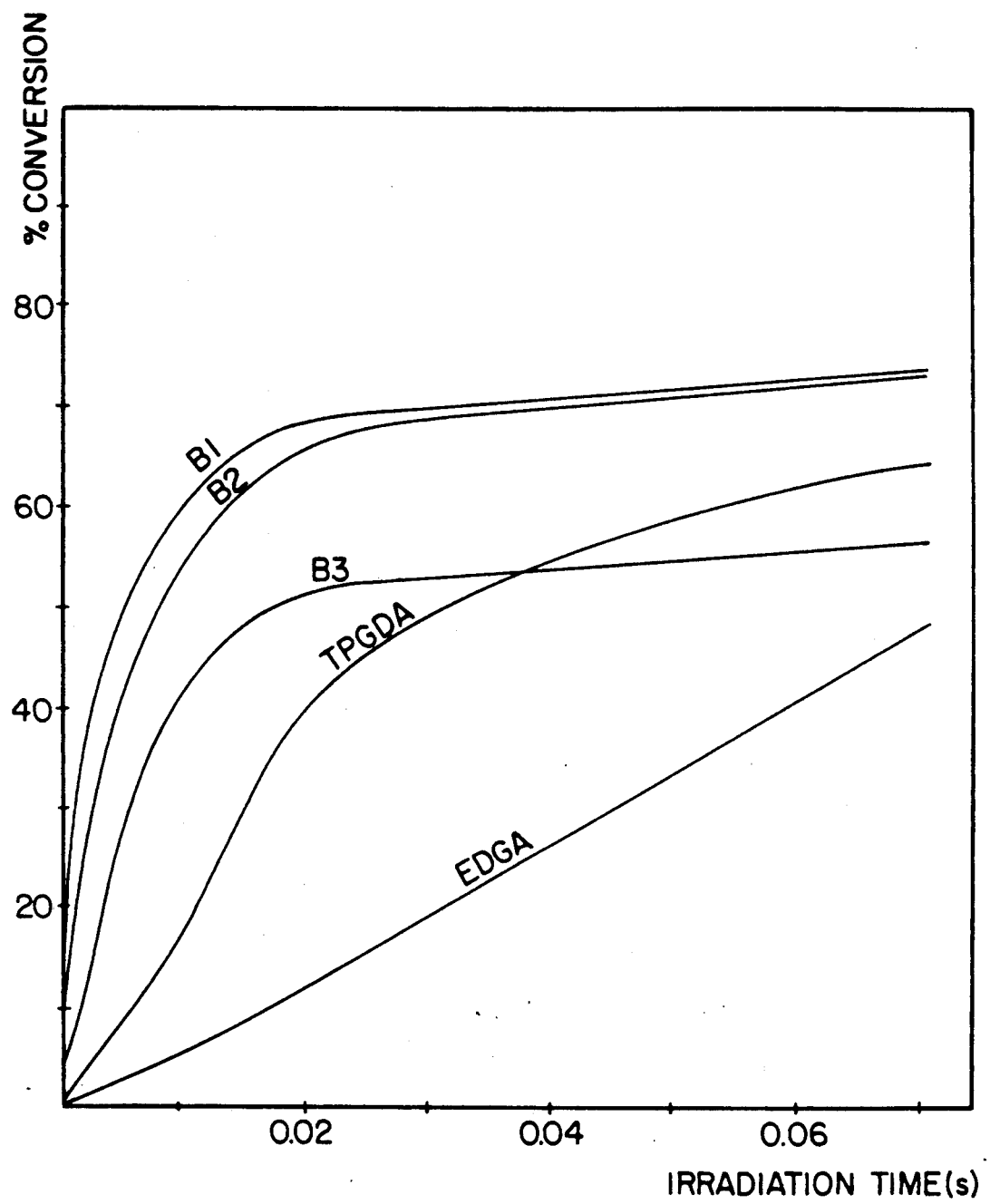

FIG. 4 brings together the curves obtained for each example, showing the degree of conversion of the acrylic functional groups present initially as a function of the irradiation time, each reactive diluent employed being indicated by its abovementioned code.

Table 4, which follows, states, for each example, the initial concentration of acrylic functional groups ([A]₀), the photopolymerization rate (Rp), the residual unsaturation content ([A]$_{resid}$) after 1 s of irradiation, and the Persoz hardness of the coating obtained after 0.2 s and 1 s of irradiation.

TABLE 4

| Ex No. | Reactive diluent | [A]₀ (eq kg⁻¹) | Rp (eq kg⁻¹ s⁻¹) | S [A]$_{resid}$ (%) | Persoz hardness (s) after 0.2 s | after 1 s |
| --- | --- | --- | --- | --- | --- | --- |
| 27 | B1 | 3.9 | 500 | 19 | 310 | 340 |
| 28 | B2 | 3.7 | 300 | 20 | / | / |
| 29 | B3 | 3.6 | 200 | 35 | / | / |
| 30 | TPGDA | 5.3 | 120 | 17 | 250 | 310 |
| 31 | EGDA | 4.6 | 35 | 15 | 50 | 75 |

These results also demonstrate the superior reactivity of the compositions according to the present invention. After 5 ms of exposure, the compositions according to the invention show a degree of conversion of between 30 and 50%, whereas this degree is only 2% with EDGA as reactive diluent and 8% with TPGDA as reactive diluent, even though the latter is a diacrylic compound, whereas the compounds B1, B2 and B3 according to the invention are monoacrylic.

It may be noted that these advantageous results are not obtained at the expense of the hardness of the coating obtained, which is very high, close to that of glass.

Supplementary tests of mandrel flexibility and of folding in 4 show that these very hard films retain, nevertheless, a great flexibility.

EXAMPLES 32 TO 35

Production of coatings by photocrosslinking of compositions (C) according to the invention in the absence of photoinitiator The operation is carried out under the general conditions described in the case of Examples 27 to 31, but the radiocrosslinkable compositions (C) do not contain any photoinitiator.

In the case of Examples 32 and 33, the radio-crosslinkable composition (C) consists solely of the abovementioned carbonate monomer B1, obtained in Example 1.

In the case of Examples 34 and 35, the radio-crosslinkable composition (C) is obtained by mixing 50 parts by weight of the diacrylic polyurethane "Actilane 20" and 50 parts by weight of the carbonate monomer B1 as reactive diluent.

In the case of Examples 32 and 34, the irradiation was used in an inert nitrogen atmosphere, while in the case of Examples 33 and 35 the irradiation was used under air, as in Examples 5 to 31.

Figure 5:
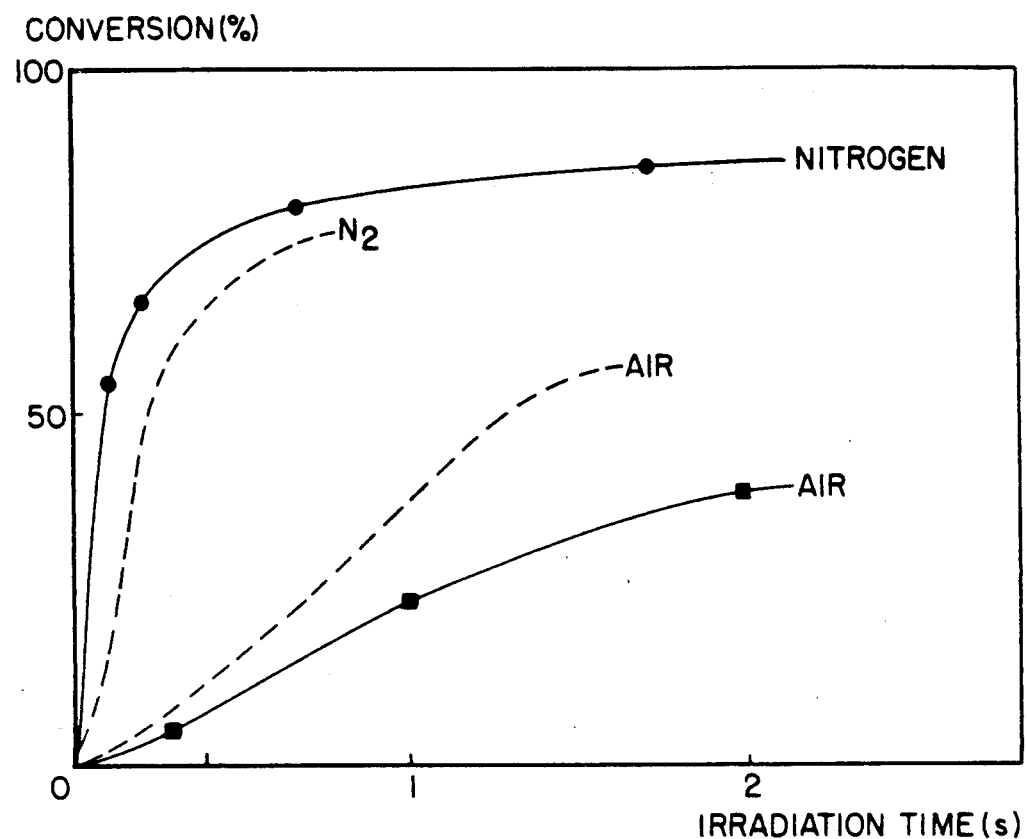

FIG. 5 brings together the curves obtained, as continuous lines in the case of Examples 32 and 33 and as dotted lines in the case of Examples 34 and 35, showing the degree of conversion of the acrylic functional groups present initially as a function of the irradiation time.

In all these examples, after 1 s of irradiation, coatings which adhere to the substrate, are dry to the touch and exhibit a suitable hardness are obtained.

In air, after 2 s of irradiation, the degree of conversion reaches 40% and the insoluble content is 65%, which confirms the crosslinking.

When the irradiation is performed in inert atmosphere, the polymerization rate is faster than in air, since a degree of conversion of more than 50% is reached after only 0.25 s of irradiation.

The very great advantages stemming from this use without any photoinitiator have already been outlined.

Comparative tests used under the same conditions as that of Examples 32 to 35, but with the monomer B1 replaced by one of the abovementioned monomers M1, M2, M3, M4, M5, EDGA, TPGDA and HDDA, show that no coating is obtained with these monomers, by themselves or in the presence of Actilane 20, and that the degree of conversion and the insoluble content are to all intents and purposes nil.

EXAMPLES 36 AND 37

Flexibility and hardness of coatings according to the invention

These 2 examples were performed under the same general conditions as those of Example 17, the film thickness being 30 μm instead of 24 μm.

In the case of Example 36, the radiocrosslinkable composition (C) is obtained by mixing 50 parts by weight of Actilane 20, 50 parts by weight of the carbonate monomer B1 and 5% by weight of Irgacure 651.

In the case of Example 37 the radiocrosslinkable composition (C) is obtained by mixing 50 parts by weight of Actilane 20, 25 parts by weight of the carbonate monomer B1, 25% by weight of HDDA and 5% by weight of Irgacure 651.

The folding test consists in folding the film obtained in 4, in applying a manual pressure and in then establishing whether or not rupture has taken place.

When applied to the coatings obtained in the case of Examples 36 and 37, this test shows that there is no rupture.

The Persoz hardness of the coating obtained in Example 36 is 90 s after 0.2 s of irradiation and 160 s after 2 s of irradiation.

That of the coating obtained in Example 37 is 220 s after 0.2 s of irradiation and 310 s after 2 s of irradiation.

The coatings obtained are therefore very hard and flexible at the same time, and this is particularly advantageous.

EXAMPLES 38 TO 40

Aging of the coatings according to the invention. Comparison with known coatings Since radiocrosslinked coatings are often employed for outdoor uses, their resistance to atmospheric yellowing was studied.

To do this, the yellowing index was measured for coatings subjected to accelerated aging in a QUV Panel-type enclosure maintained at 40° C. and equipped with UV tubes whose emission lies between 280 and 350 nm. The coatings are thus exposed to an irradiance of 1.5 mW cm$^{-2}$. Following the colouring using UV-visible spectrophotometry enables the yellowing index to be determined.

Example 38 is performed with a coating according to the invention, namely the coating obtained in Example 17 with the carbonate monomer B1 as reactive diluent.

Examples 39 and 40 are comparative examples, performed with known coatings.

Example 39 is performed with the coating obtained in Example 20 with the reactive diluent M1, and Example 40 with the coating obtained in Example 21 with the reactive diluent M2.

Figure 6:
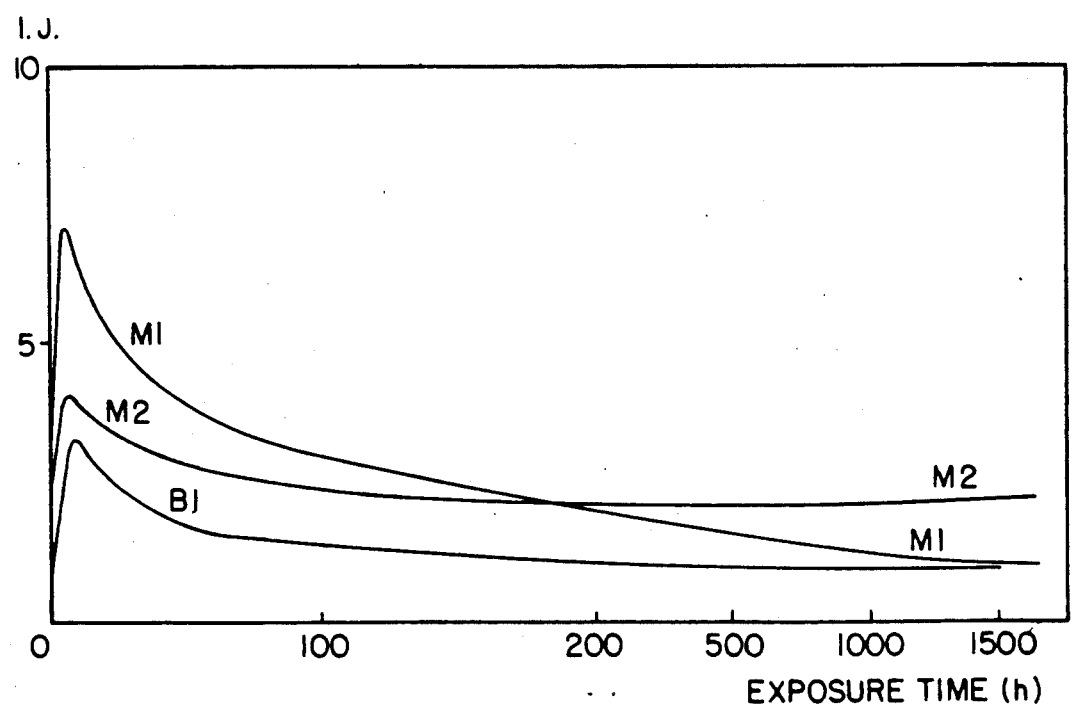

FIG. 6 brings together the curves obtained showing, for these examples, the yellowing index as a function of the exposure time in the enclosure, each reactive diluent employed for producing the coatings being indicated by its abovementioned code.

The yellowing index of the coating according to the invention, after 1,500 hours' exposure, remains very low, at a level comparable to that reached by the most resistant known coatings.

We claim:

1. Process for the manufacture of coatings by radiocrosslinking, characterized in that the procedure is according to the following successive stages:

a) A radiocrosslinkable composition (C) is produced by mixing at least one (meth)acrylic compound (A) with a reactive diluent system comprising at least one mono(meth)acrylic carbonate (B) corresponding to the general formula (I):

$$CH_2=C(R_1)-C(=O)-O-R_2-O-C(=O)-O-(CH_2)_n-CH-CH_2$$
$$\underset{O-C(=O)-O}{\underbrace{\phantom{XXXXX}}}$$

in which:

$R_1$ denotes hydrogen or the methyl group, $R_2$ denotes an alkylene ether or alkylene chain, optionally substituted by at least one methyl or ethyl group, which has a total number of carbon atoms of between 2 and 6, preferably an alkylene chain of formula $(CH_2)_m$, m being an integer such that $2 \leq m \leq 6$, n denotes an integer such that $1 \leq n \leq 6$, b) the radiocrosslinkable composition (C) is applied onto a substrate, c) the composition (C) thus applied is radiocrosslinked.

2. Process according to Claim 1, characterized in that the (meth)acrylic compound (A) is a liquid poly-(meth)acrylic oligomer with (meth)acrylic ends, whose number-average molecular mass is between 500 and 5,000, chosen preferably from the group consisting of (meth)acrylic polyester oligomers, (meth)acrylic epoxy oligomers, (meth)acrylic polycarbonate oligomers, (meth)acrylic polyether oligomers and (meth)acrylic polyurethane oligomers.

3. Process according to Claim 2, characterized in that the (meth)acrylic polyurethane oligomers are di(meth)acrylic linear polyurethane oligomers.

4. Process according to claim 1, characterized in that the (meth)acrylic compound (A) represents 25 to 60% by weight of the composition (C) and in that the reactive diluent system represents 75 to 40% by weight of the composition (C).

5. Process according to Claim 1, characterized in that the (meth)acrylic compound (A) is identical with the mono(meth)acrylic carbonate (B).

6. Process according to Claim 5, characterized in that the radiocrosslinkable composition (C) consists solely of the said mono(meth)acrylic carbonate compound (B).

7. Process according to claim 1, characterized in that $R_2$ denotes $(CH_2)_2$ and n is equal to 1, 2 or 4.

8. Process according to claim 1, characterized in that the composition (C) applied onto the substrate is crosslinked using UV radiation in the presence or in the absence of a photoinitiator.

9. Radiocrosslinkable composition (C) such as defined according to claim 1, in which the compound (A) and the carbonate (B) are not simultaneously 2,3-carbonyldioxypropyl 2-methacryloyloxyethyl carbonate.

10. Carbonate (B) corresponding to the general formula (I) according to Claim 1, in which $R_2$ denotes $(CH_2)_m$ and in which m and n are identical or different integers such that:

$2 \leq m \leq 6$ $1 \leq n \leq 6$ $n \neq 1$ when $m = 2$ and $R_1$ denotes the methyl group.

* * * * *

UNITED STATES PATENT AND TRADEMARK OFFICE
CERTIFICATE OF CORRECTION

PATENT NO. : 5,047,261
DATED : SEPTEMBER 10, 1991
INVENTOR(S) : Jean-Claude Brosse, Sammy Chevalier, Denis Couvret, Christian Decker and Khalil Moussa It is certified that error appears in the above-identified patent and that said Letters Patent is hereby corrected as shown below:

On Title Page and Column 1 Lines 1-4.

(54) Title;

Process for the manufacture of coatings by radio-crosslinking. New radiocrosslinkable compositions and new Carbonates Signed and Sealed this First Day of December, 1992

Attest:

DOUGLAS B. COMER

*Attesting Officer*   *Acting Commissioner of Patents and Trademarks*